(12) United States Patent
Blömer et al.

(10) Patent No.: US 6,174,569 B1
(45) Date of Patent: *Jan. 16, 2001

(54) THREE-LAYER METAL PIPE COATING COMPOSITIONS AND PROCESS FOR THE EXTERIOR COATING OR METAL PIPES BY A THREE-LAYER METHOD

(75) Inventors: Werner Blömer, Erlenstrasse; Udo Reiter, Regerstrasse, both of (DE); Josef Rademacher, Beverly Hills, MI (US)

(73) Assignee: BASF Coatings AG, Muenster-Hiltrup (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/892,081

(22) Filed: Jul. 14, 1997

Related U.S. Application Data

(63) Continuation of application No. 08/522,379, filed as application No. PCT/EP94/00888 on Mar. 22, 1994, now abandoned.

(30) Foreign Application Priority Data

Mar. 31, 1993 (DE) ................................................ 43 10 525

(51) Int. Cl.⁷ ............................. B05D 1/36; B29D 23/00; B32B 15/08; F16L 9/147
(52) U.S. Cl. .......................... 427/410; 138/146; 427/386; 428/35.9; 428/416; 523/466; 525/481
(58) Field of Search ........................... 428/36, 35.9, 416; 525/481; 523/466; 427/410, 386; 138/146

(56) References Cited

U.S. PATENT DOCUMENTS

| | | |
|---|---|---|
| 4,122,060 | 10/1978 | Yallourakis . |
| 4,213,486 | 7/1980 | Samour et al. ..................... 428/36.5 |
| 4,424,990 * | 1/1984 | White et al. .......................... 205/381 |
| 4,639,476 * | 1/1987 | Tang et al ............................ 523/220 |
| 5,338,348 * | 8/1994 | Savin .................................... 523/220 |
| 5,407,978 * | 4/1995 | Bymark et al. ...................... 523/466 |
| 5,478,871 * | 12/1995 | Takebe et al. ....................... 523/466 |

FOREIGN PATENT DOCUMENTS

| | | |
|---|---|---|
| 29 44 809 A1 | 11/1979 | (DE) . |
| 33 25 064 C2 | 7/1983 | (DE) ................................ C09C/1/00 |
| 3325064 * | 1/1985 | (DE) . |
| WO 92/03234 | 8/1991 | (EP) . |
| 1542333 | 3/1979 | (GB) . |
| 1-74213 * | 3/1989 | (JP) . |

OTHER PUBLICATIONS

Derwent accession No. 91–144658/20, Kurimoto Iron Works KK, Apr. 1991.*
Derwent accession No. 92–180926, Sumitomo Bakelite Co., Apr. 1992.*
Derwent accession No. 93–208873/26, Fujitsu Ltd., May 1993.*
Derwent accession No. 95–252308/33, Sumitomo Bakelite Co. Ltd., Jun. 1995.*
CAPLUS accession No. 1985: 133640 for German Patent No. 3,325,064, Quarzwerke G.m.b.H. (Jan. 24, 1985).*
JP3042078, Tomioka Kenichiro et al., "Method for heavy corrosion protective coating of steel products and product thereof", Feb. 2, 1922, p. 1/1.
JP03073340, Nippon Steel Corp., Polyolefin coated steel material with high hot salt water resistance comprises steel material, chromate treating agent layer and an epoxy primer layer, p. 2/2.

* cited by examiner

Primary Examiner—Robert E. L. Sellers

(57) ABSTRACT

The invention relates to three-layer metal pipe coating compositions based on a powder primer, on a thermoplastic hard adhesive and on a polyolefin cladding. The powder primer contains epoxidized novolak resins, phenolic crosslinking agents and fillers based on crystalline silicic acid modifications. The invention likewise relates to a process for the exterior coating of metal pipes by a three-layer method, in which the powder primer described is applied to the metal pipe, a thermoplastic hard adhesive is applied to the powder primer, and subsequently a polyolefin cladding is applied.

13 Claims, No Drawings

THREE-LAYER METAL PIPE COATING COMPOSITIONS AND PROCESS FOR THE EXTERIOR COATING OR METAL PIPES BY A THREE-LAYER METHOD

This is a continuation of U.S. pat. application Ser. No. 08/522,379, filed Oct. 30, 1995, abandoned which is a 371 of PCT/EP94/00888 filed Mar. 24, 1994.

FIELD OF THE INVENTION

The present invention relates to three-layer metal pipe coating compositions based on a powder primer containing epoxy resins and phenolic crosslinking agents, on a thermoplastic hard adhesive and on a polyolefin cladding. Furthermore, the invention relates to a process for the exterior coating of metal pipes by a three-layer method.

BACKGROUND OF THE INVENTION

Metal pipes are used worldwide for the transportation of, for example, petroleum, petroleum products, gas, water and solids from the place where they are found or produced to the consumer. Metal pipes must be protected on the one hand against corrosion and on the other hand against mechanical defects, in order to ensure the operational reliability of the lines over a long period. Exterior coatings of metal pipes must possess a high impact strength, compressive strength and abrasion resistance, and it is necessary to prevent damage to the exterior coatings during the transportation, storage, laying and operation of the metal pipes. In addition, exterior coating compositions for metal pipes should have a good aging resistance, good weathering resistance during the interim storage of the pipes, an outstanding resistance to external influences, good dielectric properties and a low permeability to water vapor and to gases.

One-coat systems based on epoxy resin are known for the exterior coating of metal pipes, but because of the low mechanical strength of the epoxy resin coatings these systems are disadvantageous when subjected to impact stress.

It is also known to coat the exterior of metal pipes using a three-layer method which involves first applying a powder primer based on epoxy resin to the metal substrate, applying a hot melt adhesive to the powder primer, and subsequently applying a polyolefin cladding. Three-layer coatings of this kind for metal pipes are described in, for example, EP-A-57 823, GB 1 542 333, DE-A-22 22 911, DE-A-22 57 135, DE-A-19 65 802, DE-A-29 44 809 and DE-A-32 30 955. These three-coat systems comprising epoxy resin primer, thermoplastic hard adhesive and polyolefin cladding material go a long way to fulfilling many of the requirements. They are markedly superior to the one-coat systems. The three-coat systems combine the positive properties of the thermosetting primer layer (good adhesion to steel) with the thermoplastic polyolefin cladding (toughness, long-term resistance, good dielectric properties, low gas permeability).

The use of powder coatings based on epoxy resins, dicyandiamide curing agents and crystalline or amorphous silicic acids as powder primer in the three-layer exterior coating compositions for metal pipes is known. Also known are powder primers comprising epoxy resins, phenolic curing agents and amorphous silicic acid fillers.

However, the disadvantages of the three-layer systems known up to now consist in an inadequate peel strength after storage in hot water, in which partial detachment of the powder coating from the substrate occurs during peeling after storage in hot water. Furthermore, the properties with regard to submigration during cathodic delamination are a continual target for improvement.

The object of the present invention was therefore to provide multi-layer coatings for the coating of metal pipes, which coatings do not have the disadvantages described above. The intention was thus to increase, in particular, the peel resistance of the coatings after storage in hot water, and also to obtain excellent results in respect of cathodic delamination. The coatings were to be firmly adhering and resistant and were to provide a high degree of protection against corrosion.

SUMMARY OF THE INVENTION

The object of the present invention is achieved by three-layer metal pipe coating compositions based on a powder primer containing epoxy resins and phenolic crosslinking agents, on a thermoplastic hard adhesive and on a polyolefin cladding. The metal pipe coating compositions are characterized in that the powder primer contains epoxidized novolak resins, phenolic crosslinking agents and fillers based on crystalline silicic acid modifications.

DESCRIPTION OF THE PREFERRED EMBODIMENTS

The epoxy resin primer, which is in powder form, contains epoxy novolak resins. In these novolak resins, the phenolic hydroxyl groups are etherified with alkyl or aryl groups or the like. Epoxide groups are incorporated into the molecule by reacting the phenolic hydroxyl groups with epichlorohydrin. The so-called epoxy novolak is formed on the basis of novolaks. The epoxidized novolaks are related in structure to bisphenol A resins. The basic model for the epoxidized novolaks is the diglycidyl ether of bisphenol F. Epoxidized novolaks can be prepared by epoxidization of novolaks which are composed, for example, of from 3 to 4 phenolic rings interconnected via methylene bridges. Other novolak resins which can be used are alkyl-substituted phenols which are reacted with formaldehyde. Epoxidized novolak resins have a higher functionality than bisphenol A resins. It is preferred to use epoxidized novolak resins having an average functionality in the range from 2.4 to 2.8 and an epoxide equivalent weight in the range from 600 to 850.

Suitable epoxidized novolak resins are commercially available, for example, under the designation DER 672U (Manufacturer: Dow Chemicals), Epikote 2014 (Manufacturer: Shell) and GT 7220 and GT 7255 (Manufacturer: Ciba Geigy).

In order to cure the epoxidized novolak resins, the powder primer contains phenolic crosslinking agents. These may, for example, be any phenolic resin, provided it has the methylol functionality which is necessary for reactivity. Preferred phenolic resins are reaction products of phenol, substituted phenols and bisphenol A with formaldehyde, which products are prepared under alkaline conditions. Under such conditions the methylol group links to the aromatic ring in either the ortho or para position. The present invention gives particular preference to employing, as phenolic crosslinking agents, hydroxyl group-containing bisphenol A or bisphenol F resins having a hydroxy equivalent weight in the range from 180 to 600, particularly preferably in the range from 180 to 300. Such phenolic curing agents are prepared by reacting bisphenol A or bisphenol F with components which contain glycidyl groups, for example the diglycidyl ether of bisphenol A. Phenolic crosslinking agents of this kind are available, for example, under the trade name DEH 81, DEH 82 and DEH 87 from Dow, DX 171 from Shell and XB 3082 from Ciba Geigy.

The epoxy resin primer contains one or more catalysts which are suitable for the epoxy resin/phenolic resin curing. Suitable catalysts are phosphonium salts of organic or inorganic acids, imidazoles and imidazole derivatives, quaternary ammonium compounds and amines. The catalysts are generally employed in proportions of from 0.001% by weight to about 10% by weight, based on the overall weight of the epoxy resin and the phenolic crosslinking agent.

Examples of suitable phosphonium salt catalysts are ethyltriphenylphosphonium iodide, ethyltriphenylphosphonium chloride, ethyltriphenylphosphonium thiocyanate, ethyltriphenylphosphonium acetate/acetic acid complex, tetrabutylphosphonium iodide, tetrabutylphosphonium bromide and tetrabutylphosphonium acetate/acetic acid complex. These and other suitable phosphonium catalysts are described in, for example, U.S. Pat. Nos. 3,477,990 and 3,341,580.

Examples of suitable imidazole catalysts are 2-styrylimidazole, 1-benzyl-2-methylimidazole, 2-methylimidazole, 2-butylimidazole. These and other imidazole catalysts are described in, for example, Belgian Patent No. 756,693.

Some commercially available phenolic curing agents already contain catalysts for the epoxy resin/phenolic resin crosslinking.

The powder primer contains crystalline silicic acid modifications as filler. These modifications are conventionally employed in a proportion of from 10 to 50% by weight, based on the overall weight of the powder primer. In some cases, it is also possible to have proportions of more than 50% by weight of filler. Crystalline silicic acid modifications can be obtained, for example, under the names Sikron SH 500 and Sikron SF 600 (Manufacturer: Quarzwerke GmbH) and Quarzsand F 31, F 32, F 34, F 36, G 30, G 32, G 34, G 36, H 30, H 31, H 32, H 33 and H 34 (Manufacturer: Quarzwerke GmbH).

The crystalline silicic acid modifications include quartz, cristobalite, tridymite, keatite, stishovite, melanophlogite, coesite and fibrous silicic acid. The fillers preferably employed in the powder primers are surface-treated crystalline silicic acid modifications. These are, for example, silane-modified silicic acid modifications based on quartz, cristobalite and vitreous fused silica. Fillers of this kind are available under the registered trademark Silbond® (Manufacturer: Quarzwerke GmbH).

It is particularly advantageous if the silicic acid modifications used as fillers in the powder primers are glycidyl-functionalized. Such modifications are available, for example, under the name Silbond 600 EST and Silbond 6000 EST (Manufacturer: Quarzwerke GmbH) and are prepared by reacting crystalline silicic acid modifications with epoxy silanes.

The powder primer preferably contains from 10 to 40% by weight, based on the overall weight of the powder primer, of crystalline silicic acid modifications.

The powder primers may also contain other inorganic fillers, for example titanium dioxide, barium sulfate and fillers based on silicate, for example talc, kaolin, magnesium silicates, aluminum silicates, mica and the like. The powder primers may if desired also contain other auxiliaries and additives. Examples of these are leveling agents, flow aids and deaerating agents, for example benzoin.

The powder primers are prepared by known methods (cf. e.g. the product information leaflet from BASF Lacke +Farben AG, "Pulverlacke" [Powder Coatings], 1990) by homogenization and dispersion, for example using an extruder, screw kneader and the like. After the powder coatings have been prepared, they are adjusted to the desired particle size distribution by milling and, if desired, by classifying and sieving.

The powder primers are applied electrostatically or triboelectrostatically to the preheated surface of the metal pipe. The applied thickness of the epoxy powder primer is usually in the range from 30 to 400 lm.

The second layer of the metal pipe coating, the thermoplastic hard adhesive, is applied either as a melt by an extrusion method or by a powder application method to the powder primer layer. Suitable adhesives (adhesion promoters) are copolymers, graft copolymers and ionomers which contain carboxyl groups, anhydride groups or groups which can be hydrolyzed to give carboxyl groups. Suitable copolymers can be prepared by copolymerizing ethylene or propylene with α,β-ethylenically unsaturated carboxylic acids such as, for example, acrylic acid, methacrylic acid, itaconic acid, crotonic acid, isocrotonic acid, maleic acid and fumaric acid, with the corresponding anhydrides or with the corresponding esters or half-esters having 1 to 8 carbon atoms in the alcohol residue. It is also possible to employ the corresponding salts of the carboxylic acids listed. Further suitable adhesives are polymers which can be prepared by grafting at least one polymer from the group comprising polyolefins with up to 10% by weight, based on the overall weight of the monomers, of at least one monomer from the group comprising α,β-ethylenically unsaturated carboxylic acids, their anhydrides, esters or salts in the presence or absence of peroxides. Thermoplastic hard adhesives which have proven suitable for coating metal pipes are copolymers of ethylene, (meth)acrylic esters and (meth)acrylic acid. Such adhesives are commercially available under the name Lucalen® (Manufacturer: BASF AG). Examples of appropriate Lucalen grades are Lucalen A 2910 M, Lucalen A 2910 M Q 47, Lucalen A 3110 M and Lucalen A 3110 M Q 244. The applied thickness of the thermoplastic hard adhesive is generally in the range from 100 to 500 lm, and the substrate temperature during the application of the thermoplastic hard adhesive is in the range from 150 to about 220° C. It should be ensured that the epoxy resin powder layer has not yet fully cured at the time of application of the adhesion promoter, in order to produce a firm bond.

To form the third layer, the metal pipe coating compositions according to the invention comprise polyolefin coating compositions which are applied to the melted adhesive at elevated temperature, usually by an extrusion method. Suitable polyolefins are low density, medium density and high density polyethylene, linear low density and linear very low density polyethylene, and also polypropylenes, their copolymers with ethylene and other monomers, and the copolymers of ethylene and of propylene with one or more comonomers from the group comprising vinyl esters, vinyl alkyl ethers, unsaturated mono- and dicarboxylic acids, and their salts, anhydrides and esters. The polyolefin coating material which is employed with particular preference is ethylene homopolymer. Suitable polyethylenes are obtainable, for example, under the tradename Lupolen® (Manufacturer: BASF AG). Examples of suitable Lupolens are Lupolen 2441 D, Lupolen 2452 D, Lupolen 3821 D and Lupolen 3652 D (BASF AG).

The present invention also relates to a process for the exterior coating of metal pipes by a three-layer method, which involves applying a powder primer based on epoxy resin to the metal pipe, applying a thermoplastic hard adhesive to the powder primer and subsequently applying a polyolefin coating material. The process is characterized in that the powder primer contains epoxidized novolak resins, phenolic resin crosslinking agents and fillers based on crystalline silicic acid modifications. With regard to the description of the multi-layer metal pipe coating composition, reference is made to the statements made above. In the process according to the invention, the surface of the metal pipe is first conventionally cleaned to remove rust, grease, oil, dust etc. A chemical pretreatment may be carried out if desired (chromating and/or phosphatizing). The cleaned metal pipes are then heated, by inductive heating or in a gas oven, to a coating temperature of from approximately 170 to 220° C. The powder primer is applied electrostatically or by means of triboelectric charging to the hot surface of the metal pipe. Conventional application thicknesses of the powder primer are in the range from 30 to 400 lm, preferably in the range from 80 to 100 lm. In accordance with the present process, the second layer—the thermoplastic hard adhesive—is applied either as a melt by an extrusion method or by a powder application method to the powder primer layer. A particularly good bond between the powder primer layer and the adhesive layer is achieved if the degree of crosslinking of the powder primer, at the time of application of the thermoplastic hard adhesive, is from 40 to 60%. In any case, however, it should be ensured that the epoxy resin powder primer has not yet fully cured at the time of application of the thermoplastic hard adhesive, in order to achieve adequate adhesion. During the application of the thermoplastic adhesive, the substrate temperature is usually in the range from 150 to 220° C. The conventional application thickness of the thermoplastic adhesion promoter is in the range from 100 to 500 lm, preferably in the range from 180 to 350 lm. In a further step, the polyolefin cladding material is then applied by an extrusion method to the melted thermoplastic hard adhesive. Conventional applied thicknesses of the polyolefin cladding layer are in the range from 1.8 to 3.7 mm. The polyolefin cladding material is applied, in the case of small pipe diameters, by the annular die method using a crosshead, and, in the case of larger metal pipe diameters, by the extrusion cladding method using a slot die. In the annular die method, the thermoplastic adhesive can either be coextruded with the polyolefin cladding material or else the thermoplastic hard adhesive can be applied by a powder application method and the polyolefin cladding material by tube extrusion. After it has been coated in three layers, the metal pipe with sleeve is conventionally cooled in a water bath.

The three-layer metal pipe coatings which can be obtained by the process according to the invention have outstanding properties. For instance, there is no detachment of the powder primer from the substrate. Good properties are obtained in respect of the elongation at break of the polyolefin cladding layer and in respect of the specific cladding resistance. An increase is obtained in the peel resistance of the coating after storage in hot water, and the results in respect of cathodic delamination are very good.

In the following text the invention is illustrated in more detail using exemplary embodiments. Parts denote parts by weight unless stated otherwise.

COMPARATIVE EXAMPLE 1:

A powder coating is prepared having the following composition:

| | |
|---|---|
| titanium dioxide, rutile | 5% by weight |
| crystalline silicic acid | 30% by weight |
| leveling agent | 1% by weight |
| deaerating agent | 1% by weight |
| epoxy resin (Epikote 1055 from Shell) having an epoxide equivalent weight of 800) | 59% by weight |
| dicyandiamide | 4% by weight |

COMPARATIVE EXAMPLE 2:

A powder coating is prepared having the following composition:

| | |
|---|---|
| titanium dioxide, rutile | 5% by weight |
| amorphous silicic acid | 30% by weight |
| leveling agent | 1% by weight |
| deaerating agent | 1% by weight |
| epoxidized novolak resin (Shell Epikote 2014, EEW 700) | 48% by weight |
| phenolic curing agent based on bisphenol A (commercial product XB 3082 from Ciba Geigy, hydroxy equivalent weight 250) | 15% by weight |

EXAMPLE 1:

A powder coating is prepared from the following components:

| | |
|---|---|
| titanium dioxide, rutile | 5% by weight |
| crystalline silicic acid, functionalized with glycidyl groups (Silbond 6000 EST from Quarzwerke GmbH) | 30% by weight |
| leveling agent | 1% by weight |
| deaerating agent | 1% by weight |
| epoxidized novolak resin (Epikote 2014 from Shell, EEW 700) | 48% by weight |
| phenolic curing agent based on bisphenol A (commercial product XB 3082 from Ciba-Geigy, hydroxy equivalent weight 250) | 15% by weight |

The three formulations described above (Comparative Example 1 and 2, Example 1) are processed to give powder coatings of commercially conventional particle size distribution. The three powder coatings prepared are employed as primer in a three-layer method for the exterior coating of metal pipes.

For this purpose, pipes having a diameter of 300 mm and a wall thickness of 12 mm are blasted in a blasting unit to degree of cleanness SA 3. The peak-to-valley height should be approximately 50 lm. The pipes are then heated with an induction coil to 200±5° C.

The powder coatings of Comparative Examples 1 and 2 and of Example 1 are applied electrostatically at a layer thickness of from 80 to 100 lm. After a degree of crosslinking of from 40 to 60% has been determined, a pulverulent thermoplastic hard adhesive (Lucalen A 3110 M Q 244 from BASF AG) is in each case applied electrostatically to the powder primer in a layer thickness of 300±50 lm. About 10 sec. after the extrusion of the adhesive, a 3±0.2 mm thick layer of the polyolefin having the tradename Lupolen 3652 D (Manufacturer: BASF AG) is applied by an annular die method at 220±10° C. About 30 sec. after completion of the three-layer coating, the pipes are cooled to room temperature in a water bath.

The three pipes obtained are divided into test rings of about 15 cm in width. CD tests in accordance with DIN 30671 are carried out on the three different three-layer structures under the conditions of 30 days at room temperature, 2 days at 65° C., and 14 days at 65° C. in 0.5 molar sodium chloride solution.

Submigration [mm]

|  | 2 days 65° C. | 14 days 65° C. | 30 days 23° C. |
|---|---|---|---|
| Comparative Ex. 1 | 2 | 7 | 4 |
| Comparative Ex. 2 | 2 | 5 | 4 |
| Example 1 | 0 | 5 | 1 |

In addition, the peel resistance according to DIN 30 670 is determined for all three structures. The values found are in each case >40 N/cm at 23° C.

A test segment of each layer structure is stored for 6 weeks in mains water at 80° C.

For the pipe section with the primer powder according to Comparative Example 1, peel values of about 15 N/cm are found. In this case there is detachment of the powder coating from the substrate in addition to cohesive fracture of the adhesive layer.

For the pipe section with the primer powder according to Comparative Example 2, peel values of about 20 N/cm are found. Here too, detachment of the powder coating from the substrate is observed at some points in addition to cohesive fracture of the adhesive layer.

For the pipe section with the powder primer according to Example 1, peel values of over 25 N/cm are found. Cohesive fracture occurs only in the adhesive layer.

What is claimed is:

1. A three-layer metal pipe coating composition comprising a first layer that is applied to the pipe and is a powder primer, a second layer that is a thermoplastic hard adhesive, and a third, outer layer that is a polyolefin cladding, wherein the powder primer contains epoxidized novolak resins, phenolic crosslinking agents, and crystalline silicic acid modifications.

2. A metal pipe coating composition according to claim 1, wherein the epoxidized novolak resins have an average functionality in the range from 2.4 to 2.8 and an epoxide equivalent weight in the range from 600 to 850.

3. A metal pipe coating composition according to claim 1, wherein the phenolic crosslinking agents used are selected from the group consisting of hydroxyl group-containing bisphenol A resins and hydroxyl group-containing bisphenol F resins, wherein said resins have a hydroxyl equivalent weight in the range from 180 to 600.

4. A metal pipe coating composition according to claim 1, wherein the crystalline silicic acid modifications are glycidyl-functionalized.

5. A metal pipe coating composition according to claim 1, wherein the powder primer contains from 10 to 40% by weight of crystalline silicic acid modifications.

6. A process for the exterior coating of metal pipes by a three-layer method, comprising applying a powder primer to a metal pipe, applying a thermoplastic hard adhesive to the powder primer, and subsequently applying a polyolefin cladding, wherein the powder primer contains epoxidized novolak resins, phenolic crosslinking agents, and crystalline silicic acid modifications.

7. A process according to claim 6, wherein the epoxidized novolak resins have an average functionality in the range from 2.4 to 2.8 and an epoxide equivalent weight in the range from 600 to 850.

8. A process according to claim 6, wherein the crystalline silicic acid modifications are glycidyl-functionalized.

9. A process according to claim 6, wherein the powder primer contains from 10 to 40% by weight crystalline silicic acid modifications.

10. A process according to claim 6, wherein the phenolic crosslinking agents used are selected from the group consisting of hydroxyl group-containing bisphenol A resins and hydroxyl group-containing bisphenol F resins, wherein said resins have a hydroxyl equivalent weight in the range from 180 to 600.

11. A process according to claim 6, wherein the thermoplastic hard adhesive used comprises copolymers of ethylene and compounds selected from the group consisting of acrylic acid, methacrylic acid, esters of acrylic acid having 1 to 8 carbon atoms in the alcohol residue, esters of methacrylic acid having 1 to 8 carbon atoms in the alcohol residue, and mixtures thereof.

12. A process according to claim 6, wherein the polyolefin cladding used is a polyethylene sleeve.

13. A process according to claim 6, wherein the degree of crosslinking of the powder primer during the application of the thermoplastic hard adhesive is from 40 to 60 %.

* * * * *